Patented Jan. 14, 1930

1,743,096

UNITED STATES PATENT OFFICE

ROYAL C. BERGVALL, OF WILKINSBURG, PENNSYLVANIA, ASSIGNOR TO WESTING-HOUSE ELECTRIC & MANUFACTURING COMPANY, A CORPORATION OF PENNSYLVANIA

REGULATOR SYSTEM

Application filed June 29, 1928. Serial No. 289,190.

My invention relates to regulator systems and particularly to regulator systems for governing an electrical quantity of a dynamo-electric machine.

An object of my invention is to provide a regulator system that shall be quick-acting and accurate in its operation and that shall be capable of controlling the voltage applied to the field winding of a dynamo-electric machine below the residual voltage of an exciter supplying electrical energy to said field winding.

A further object of my invention is to provide a regulator system of the above-indicated character, wherein the voltage applied to the field winding of a dynamo-electric machine may be regulated below the residual voltage of an exciter supplying current to the field winding without introducing a resistor element into the circuit between the exciter and the field winding.

My invention contemplates the use of a main and an auxiliary field winding for an exciter generator, the main winding being connected in circuit with a variable resistor, the effective value of which may be controlled for varying the excitation of the exciter generator. The auxiliary winding is differentially related to the main winding and comprises sufficient ampere-turns capacity to reduce the voltage of the exciter generator from the residual value of the main field to substantially zero. A polarized relay may also be used for the purpose of disconnecting or short-circuiting the auxiliary field winding in case the flux produced thereby becomes greater than the flux produced by the main field winding, thereby reversing the polarity of the exciter generator.

Figure 1:
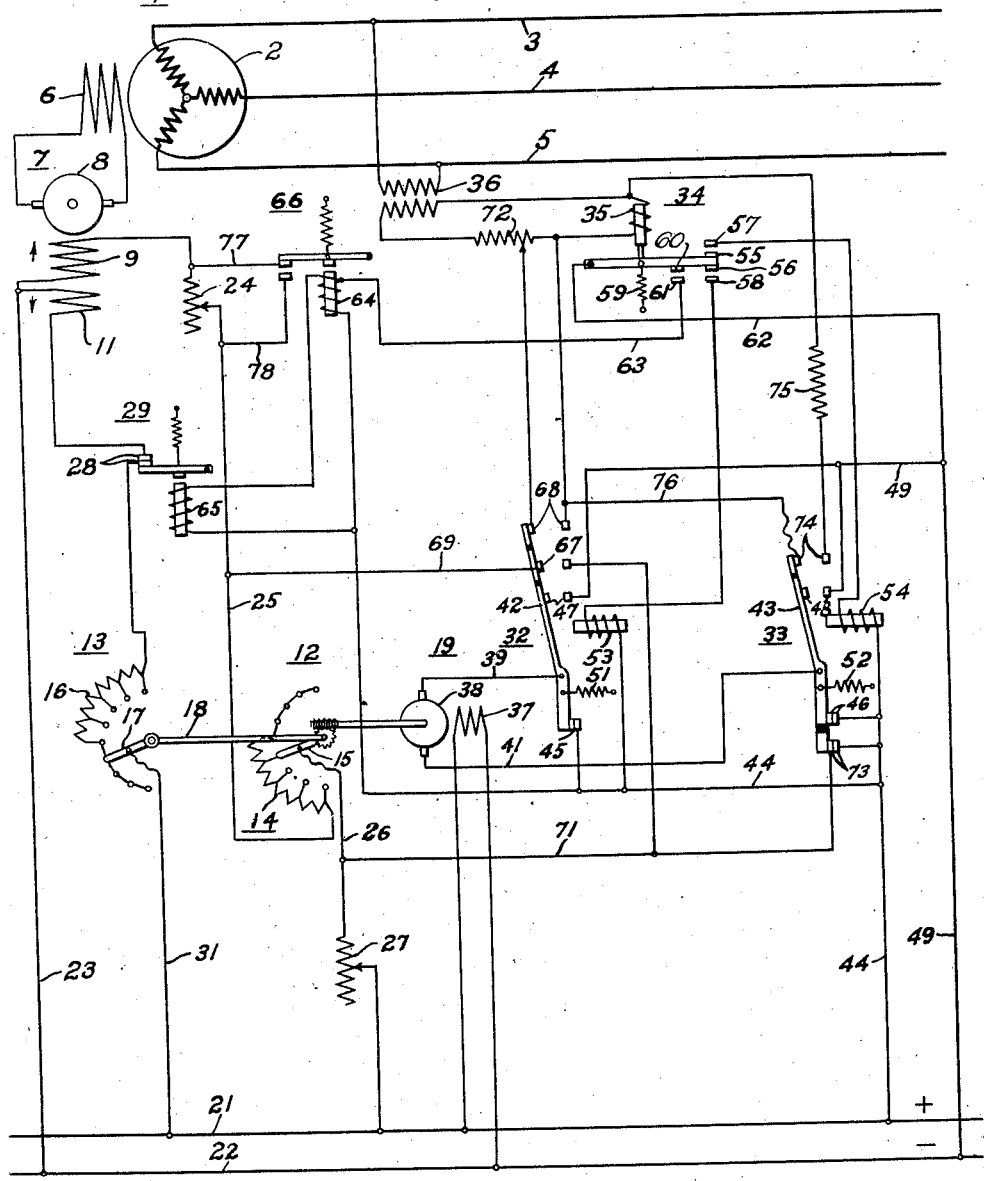
Figure 2:
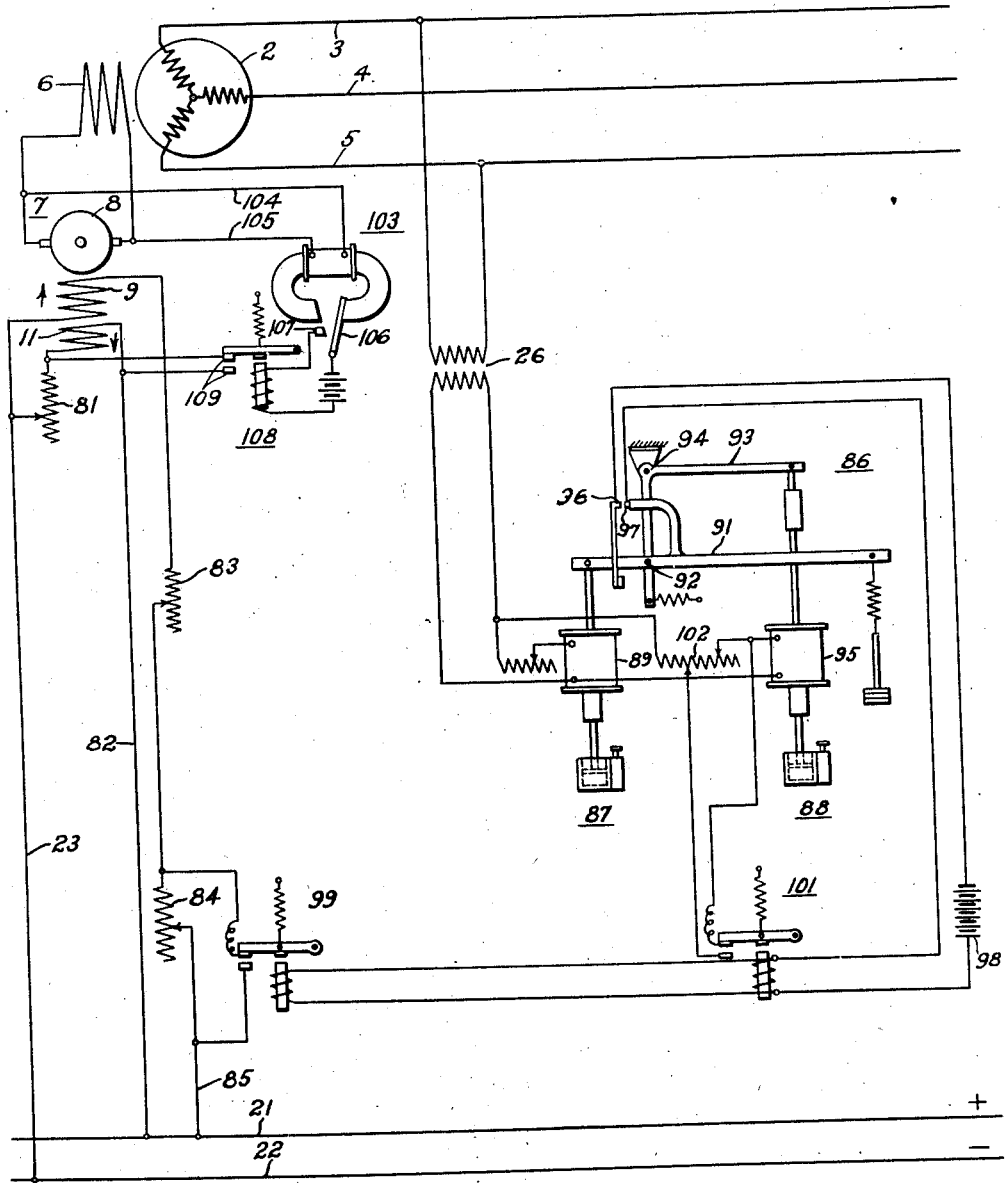

In the accompanying drawing,

Figure 1 is a diagrammatic view of apparatus and circuits comprising one preferred embodiment of my invention, wherein the rheostatic type of regulator is used, and Fig. 2 is a diagrammatic view of apparatus and circuits comprising a second preferred embodiment of my invention, wherein the vibratory type of regulator is used.

Referring to Fig. 1 of the drawing, an electric generator or synchronous condenser 1 is provided having an armature winding 2 that is connected to supply-circuit conductors 3, 4, 5 and a field winding 6, that is connected to be energized from an exciter generator 7. The exciter generator 7 is provided with an armature winding 8, a main field winding 9 and an auxiliary field winding 11 that is differentially related to the field winding 9.

Motor-operated rheostats 12 and 13 are provided, the rheostat 12 having a resistor element 14 and a movable contact arm 15, and the rheostat 13 having a resistor element 16 and a movable contact arm 17. The contact arms 15 and 17 of the two rheostats are connected together by any suitable means, such as a shaft 18, and are connected to be simultaneously operated by a pilot motor 19. The main field winding 9 of the exciter generator is connected to be energized from supply-circuit conductors 21 and 22 by a circuit from conductor 22, through conductor 23, field winding 9, a resistor 24, conductor 25, rheostat 12, conductor 26, and a rheostat 27, to supply conductor 21. The auxiliary field winding 11 is connected to the supply conductors 21 and 22 by a circuit extending from supply conductor 22, through conductor 23, field winding 11, normally closed contact members 28 of the relay 29, the rheostat 13, and the conductor 31, to the supply conductor 21.

It will be noted that the contact arms 15 and 17 of the rheostats 12 and 13, respectively, are so positioned that, when the contact arm 15 is being actuated over the operative regulating range of the rheostat 12, the contact arm 17 will be moving over rheostat buttons that are directly connected together, so that there is no variation in the resistance of the rheostat 13. When the rheostat arms are moved upwardly and the rheostat arm 15 reaches a position corresponding to inclusion of substantially all of the resistor 14 in the circuit of the field winding 9, corresponding to a low value of excitation of that winding, a further movement of the rheostat arms in an upward direction will decrease the value of the resistor element 16, in circuit with the field winding 11, thus increasing the excitation of the field winding 11 or decreasing the total excitation of the exciter generator 7.

The regulating rheostats 12 and 13 are operated by the pilot motor 19 that is controlled by reversing switches 32 and 33 in accordance with the operation of a contact-making voltmeter or regulator 34. The regulator 34 comprises an actuating coil 35 that is operatively connected, by means of a voltage transformer 36, to be energized in accordance with the voltage of the dynamo-electric machine 1, or the voltage of the supply conductors 3, 4, 5.

The pilot motor 19 is provided with a field winding 37 that is connected to be energized from any suitable direct-current source, such as the supply conductors 21, 22, and with an armature winding 38 that is connected, by means of conductors 39 and 41, to movable contact arms 42 and 43, respectively, of the reversing switches 32 and 33.

When the reversing switches 32 and 33 are deenergized, they stand in the positions illustrated in the drawing, and close a circuit from the armature winding 38 of the pilot motor 19 through the cooperating pairs of contact members 45 and 46 of the reversing switches, conductors 39, 41 and 44, thus closing a dynamic-braking circuit for the pilot motor. The stationary contact members 45 and 46 are connected, by means of the conductor 44, to one of the direct-current supply conductors 21.

Similar pairs of contact members 47 and 48 of the reversing switches 32 and 33 are connected, by means of conductor 49, to the supply conductor 22, and are adapted to connect one side of the pilot-motor armature to the supply conductor 22 upon the operation of one of the reversing switches to a second operative position.

The reversing switches 32 and 33 are provided with biasing members 51 and 52, respectively, for normally holding the switches in their illustrated, or dynamic-braking positions. The reversing switches are also provided with operating electro-magnets 53 and 54 that are energized in accordance with the operation of the regulator 34. The regulator 34 comprises movable contact members 55 and 56 that are adapted to engage stationary contact members 57 and 58, respectively, and are connected, by means of conductors 62 and 49, to one of the supply conductors 22. The regulator 34 also comprises a biasing member 59 that normally opposes the upward pull of the winding 35, and a movable contact member 60 that is adapted to engage a fixed contact 61 when the voltage across the winding 35 is reduced to a predetermined amount below that necessary to cause the engagement of the contact members 56 and 58.

Upon engagement of the contact members 56 and 58, a circuit is completed, through conductors 49 and 62, contact members 56 and 58, the operating winding of electro-magnet 53, and conductor 44, to the supply conductor 21. Similarly, upon engagement of the contact members 55 and 57, a circuit is completed from the supply conductor 22, through conductors 49 and 62, contact members 55 and 57, the operating coil of electromagnet 54 and conductor 44, to the supply conductor 21.

Upon engagement of the contact members 60 and 61, a circuit is completed from supply conductor 22, through conductors 49 and 62, contact members 60 and 61, conductors 63, the parallel-connected windings 64 and 65 of the relays 66 and 29, respectively, and conductor 44, to the supply conductor 21.

The operation of the form of the invention illustrated in Fig. 1 is as follows: If the voltage of the dynamo-electric machine 1 falls below the desired value, the energization of the regulator winding 35 will be decreased, thus permitting the movable contact member 56 to engage the contact member 58 and establish a circuit through the winding of the electromagnet 53, as traced above, thus operating the switch 32 to its second operating position.

The reversing switch 32, when actuated to its second operating position, separates the pair of contact members 45 and causes engagement of the cooperating pairs of contact members 47, 67 and 68. A circuit through the armature winding 38 of the pilot motor may now be traced from the supply conductor 21, through conductor 44, cooperating contact members 46, conductor 41, armature winding 38, conductor 39, contact members 47, and conductor 49 to the supply conductor 22, causing the pilot motor to operate in a direction to decrease the resistance in circuit with the field winding 9 and thus increase the excitation of the exciter generator 7 and of the dynamo-electric machine 1.

The operation of the reversing switch 32 to its second operating position also completes a circuit in shunt relation to the rheostat 12, through conductor 69, contact members 67 of the reversing switch 32 and conductor 71, thus entirely excluding the rheostat 12 from the circuit of the field winding 9 of the exciter generator, during the operation of the rheostat in this direction, and causing the voltage of the exciter generator to rise rapidly.

The contact members 68 of the reversing switch 32, upon engagement, cause a portion of the resistor 72 to be excluded from the circuit of the regulator winding 35, thus increasing the energization thereof slightly, and hastening the separation of the contact members 56 and 58 of the regulator to prevent it from hunting.

When the voltage of the dynamo-electric machine 1 again approaches its normal value, the contact members 58 and 56 will be disengaged, and the reversing switch 32 will be immediately biased to its illustrated position, thus closing the above traced dynamic-braking circuit through the contact members 45 and causing the pilot motor 19 to stop promptly. The circuit through the contact members 67 will be simultaneously interrupted and again introduce the rheostat 12 into the circuit of the field winding 9. If the movement of the regulator rheostat 12 has been sufficient to correct the excitation of the machine 1, and bring it back to its normal value, the system will remain at rest until another variation in the line voltage occurs.

If the forcing of the field in the winding 9, caused by shunting the rheostat 12 from the field winding circuit through the contact members 67, has caused the voltage of the generator to rise so rapidly that the full correction required in the setting of the rheostat 12 has not been made, the voltage of the line conductors will again drop, causing the regulator 34 to again close the circuit through the contact members 56 and 58 and continue the operation of the rheostats. This action will be repeated until the required correction has been made.

If the voltage of the machine 1 rises above its desired value, the winding 35 of the contact-making voltmeter, or regulator, 34 will be energized to cause engagement of the contact members 55 and 57, thus completing a circuit through the windings of the electromagnet 54, as described above, and operating the reversing switch 33 to its second operating position.

Upon the operation of the reversing switch 33 to its second operating position, the pairs of cooperating contact members 46 and 73 are disengaged, and the pairs of cooperating contact members 48 and 74 are brought into engagement. A circuit is now completed through the armature winding 38 of the pilot motor 19 in the opposite direction to that completed upon the operation of the reversing switch 32, and may be traced from the direct-current-supply conductor 21, through conductor 44, contact members 45 of the reversing switch 32, conductor 39, armature winding 38, conductor 41, contact members 48 and conductor 49, to the supply conductor 22. The pilot motor 19 is, therefore, caused to operate the rheostats 12 and 13 in a direction to increase the resistance in the field circuit 9 of the exciter generator to thereby decrease the voltage of the exciter generator and of the dynamo-electric machine 1.

The above described operation of the reversing switch 33 interrupts the circuit in shunt relation to the rheostat 27 which is normally completed through conductor 71, contact members 73 of the reversing switch 33 and conductor 44, thus introducing the rheostat 27 into the circuit of the field winding 9 and causing the energization thereof to decrease rapidly during the operation of the rheostats 12 and 13. The contact members 74 complete a circuit through the resistor 75 in shunt relation to the winding 35 of the regulator, thus decreasing the excitation of the regulator winding 35 and hastening the disengagement of the contact members 55 and 57 to prevent hunting action of the regulator.

When the voltage of the dynamo-electric machine 1 has decreased sufficiently, the contact members 55 and 57 will be disengaged, and the reversing switch 33 will return to its illustrated position and complete the dynamic-braking circuit for the pilot motor 19 through the contact members 46 and again shunt the rheostat 27 from the field-winding circuit through the contact members 73.

If the operation of the regulator rheostats has not been sufficient to correct the excitation of the dynamo-electric machine 1, and produce the desired voltage, the regulator 34 will again operate and continue the regulating action as described above.

When the regulator 34 is actuated to its lower position, upon a slight drop in the voltage of the power circuit, the contact members 56 and 58 are brought into engagement, as described above, causing the pilot motor 19 to operate in a direction to increase the excitation on the dynamo-electric machine 1. If, however, the voltage of the supply conductors drops more than a predetermined amount, such as might be expected upon the occurrence of a short circuit or other fault upon the power line, and where a very rapid increase in the excitation of the dynamo-electric machine 1 is required, the energization of the regulator winding 35 will be decreased sufficiently to cause engagement of the contact members 60 and 61. This operation of the regulator causes the pilot motor 19 to operate as described above and also causes the energization of the windings 64 and 65 of the relays 66 and 29 through the circuit above traced. The relay 66 is, therefore, actuated to its circuit-closing position, completing a circuit through conductors 77 and 78 in shunt relation to the resistor 24, thus causing a more rapid increase in the energization of the field winding 9. Simultaneously with the operation of the relay 66, the relay 29 is actuated to open the circuit through the contact members 28, thus rapidly deenergizing the auxiliary differentially related field winding 11. The simultaneous rapid increase in excitation of the main field winding 9, and rapid decrease in the excitation of the auxiliary field winding 11, causes a very rapid increase in the excitation of the exciter generator 7 and of the dynamo-electric machine 1.

Referring to the form of the invention illustrated in Fig. 2, a dynamo-electric machine 1, connected to the power circuit conductors 3, 4 and 5, and the exciter generator 7, having main and auxiliary field windings 9 and 11, respectively, are illustrated as being similar to the corresponding elements shown in Fig. 1.

The auxiliary field winding 11 may be connected between the supply-circuit conductors 21 and 22 through conductor 23, manually operated rheostat 81 and conductor 82. The circuit of the main field winding 9 is illustrated as leading from the supply conductor 22, through conductor 23, field winding 9, manually operated rheostat 83, variable resistor 84, and conductor 85, to the supply conductor 21.

The excitation of the field winding 9 is, in this case, controlled by a vibrating regulator 86 that is energized from the voltage transformer 26 in accordance with the voltage of the power-circuit conductors 3, 4 and 5. The regulator 86 is a vibrating regulator of a well known type and comprises a regulating magnet 87 and a vibrating magnet 88. The magnet 87 is provided with an operating winding 89 that is connected to the voltage transformer 26. The electromagnet 87 actuates the lever 91 that is pivotally supported at 92 upon the lower portion of the bell-crank lever 93 which is supported on a fixed pivot 94. The electromagnet 88 is provided with an actuating winding 95 that is connected to the voltage transformer 26 and is mechanically connected to the horizontal portion of the bell-crank lever 93. Regulating contacts 96 and 97 are provided, the contact member 96 being a fixed member and the contact member 97 being carried by an upwardly extending arm portion of the lever 91.

Upon a decrease in the voltage of the power circuit 3, 4, 5 below the desired value, depending upon the setting of the regulator, the energization of the electromagnet windings 89 and 95 decrease, causing a lowering of the cores of the magnets 87 and 88, and actuating the contact members 96 and 97 into engagement, thus completing a circuit from a source of direct-current supply, such as a battery 98, through the operating windings of relays 99 and 101. The contact members of the relay 99 are brought into engagement, thus closing a circuit in shunt relation to the resistor 84 and increasing the energization of the field winding 9 of the exciter generator. The contact members of the anti-hunting, or vibrating, relay 101 are brought into engagement, thus closing a circuit in shunt relation to a resistor 102 in circuit with the coil 95 of the vibrating electromagnet 88, increasing the energization thereof and causing the core of the magnet to be raised. The horizontal portion of the bell-crank lever 93 is correspondingly raised, actuating the bell-crank about the fixed pivot 94 and moving the pivot 92, carrying the lever 91, toward the right, thus causing disengagement of the contact members 96 and 97. This operation of the regulator continues, the contact members 96 and 97 being rapidly brought into engagement and disengaged, the ratio between the periods of their engagement and disengagement, determining the effective value of the resistor 84 in circuit with the field winding 9.

A polarized relay 103 is provided, having the winding thereof connected across the terminals of the exciter generator 7 by conductors 104 and 105. The polarized relay is normally energized in a direction to maintain the armature 106 in the illustrated position. If, however, the energization of the main field winding 9 is reduced to such a low value that the differentially related field winding 11 causes a reversal in the field flux of the exciter generator 7 and, consequently, a reversal of the polarity of this generator, the armature 106 will be actuated to close a circuit through the contact member 107. This operation of the relay 103 actuates the relay 108 to its lower position to close a circuit in shunt relation to the field winding 9 through the contact members 109, thus completing a circuit between the conductors 23 and 82 through the resistor 81.

The polarized relay 103 is not illustrated in the form of the invention shown in Fig. 1, although it will be obvious that its use is not dependent upon the form of the regulator used to control the excitation of the generator field windings. It will also be apparent that the schematically illustrated field windings 9 and 11 may represent a plurality of such windings connected either in series or in parallel-circuit relation, as may be desired.

Since modifications may be made in the apparatus and circuits described without departing from the spirit of my invention, I do not wish to be limited otherwise than by the scope of the appended claims.

I claim as my invention:

1. In a regulator system, a dynamo-electric machine comprising two differentially related field windings, a regulator actuated in accordance with variations in the voltage of said dynamo-electric machine, means controlled by said regulator for varying the energization of one of said field windings, said field windings cooperating to vary the voltage of said dynamo-electric machine below the residual voltage of the machine, and means operable under certain conditions of the system for rapidly varying the energization of the other of said field windings.

2. In a regulator system, a dynamo-electric machine comprising a main field winding and an auxiliary field winding differentially related to said main field winding, regulator means normally operable for governing the energization of said main field winding, and means operable under certain conditions of the system for rapidly varying the energization of said auxiliary winding.

3. In a regulator system, a dynamo-electric machine comprising a main field winding and an auxiliary field winding differentially related to said main field winding, a variable resistor in circuit with said main field winding, means actuated in accordance with an electrical quantity of said dynamo-electric machine for varying the effective value of said resistor, and means actuated in accordance with an electrical characteristic of said dynamo-electric machine for rapidly decreasing the energization of said auxiliary field winding.

4. In a regulator system, a dynamo-electric machine and a power circuit connected thereto, means for governing the excitation of said machine comprising a main field winding and an auxiliary field winding differentially related to said main field winding, a rheostat in circuit with said main field winding, a rheostat in circuit with said auxiliary field winding, and means actuated in accordance with an electrical quantity of said circuit for operating said rheostats, said rheostats being arranged to vary the resistance of their respective circuits during different operating ranges of the system.

5. In a regulator system, a dynamo-electric machine comprising a main field winding and an auxiliary field winding differentially related thereto, means for governing the excitation of said main field winding comprising a variable resistor and a second resistor in circuit therewith, means operable for gradually varying said variable resistor, means for short-circuiting said second resistor during predetermined regulating operations, and means for simultaneously short-circuiting both said variable resistor and said second resistor and for rapidly decreasing the energization of said auxiliary field winding.

6. In a regulator system, a dynamo-electric machine and a power circuit connected thereto, means for governing the excitation of said machine comprising a main field winding and an auxiliary field winding differentially related thereto, a rheostat in circuit with said main field winding, means actuated in accordance with an electrical quantity of said power circuit for operating said rheostat, and means effective during certain operations of said rheostat for abruptly varying the energization of said field windings in opposite directions.

In testimony whereof, I have hereunto subscribed my name this 25th day of June, 1928.

ROYAL C. BERGVALL.